US012745475B2

(12) United States Patent
Kim

(10) Patent No.: US 12,745,475 B2

(45) Date of Patent: Sep. 22, 2026

(54) IMAGE SENSING DEVICE INCLUDING OPTICAL ELEMENTS AND METHOD FOR MANUFACTURING THE SAME

(71) Applicant: SK hynix Inc., Icheon-si (KR)

(72) Inventor: Han Jun Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 351 days.

(21) Appl. No.: 18/646,613

(22) Filed: Apr. 25, 2024

(65) Prior Publication Data

US 2025/0151437 A1 May 8, 2025

(30) Foreign Application Priority Data

Nov. 3, 2023 (KR) ........................ 10-2023-0150751

(51) Int. Cl.

| | |
|---|---|
| ***H10F 39/00*** | (2025.01) |
| ***B82Y 20/00*** | (2011.01) |
| ***G06F 30/27*** | (2020.01) |
| *G06F 111/14* | (2020.01) |

(52) U.S. Cl.

CPC .......... *H10F 39/8063* (2025.01); *B82Y 20/00* (2013.01); *G06F 30/27* (2020.01); *H10F 39/024* (2025.01); *H10F 39/8053* (2025.01); *G06F 2111/14* (2020.01)

(58) Field of Classification Search

CPC .... H10F 39/8063; H10F 39/806; H04N 25/11

See application file for complete search history.

(56) References Cited

U.S. PATENT DOCUMENTS

| | | | | |
|---|---|---|---|---|
| 12,266,669 | B2 * | 4/2025 | Cho | H04N 25/704 |
| 2020/0052021 | A1 * | 2/2020 | Takahashi | G02B 5/20 |
| 2020/0396388 | A1 * | 12/2020 | Kim | H04N 23/55 |
| 2021/0392279 | A1 * | 12/2021 | Numata | H04N 23/12 |

(Continued)

FOREIGN PATENT DOCUMENTS

| | | | | |
|---|---|---|---|---|
| JP | 2022027780 A | | 2/2022 | |
| KR | 20210056754 A | * | 5/2021 | H10F 39/18 |

(Continued)

OTHER PUBLICATIONS

Miyata, M. et al., “Full-color-sorting metalenses for high-sensitivity image sensors.” Optica, 2021, 9 pages.

(Continued)

*Primary Examiner* — Abdullahi Nur

(74) *Attorney, Agent, or Firm* — Ashurst Perkins Coie US LLP

(57) ABSTRACT

Image sensing devices including meta lenses and methods for manufacturing the image sensing devices are disclosed. In an embodiments, an image sensing device includes a plurality of microlenses including first to fourth microlenses arranged in a (2×2) matrix structure, a plurality of optical filters disposed under the first to fourth microlens, and configured to correspond to the first to fourth microlenses, one microlens per optical filter, respectively, and an optical element disposed at a center of the (2×2) matrix structure among the first to fourth microlenses and configured to separate incident light into light rays of in different wavelength ranges of different colors to guide each of the light rays to one of the plurality of optical filters of a corresponding color.

22 Claims, 17 Drawing Sheets

(56) References Cited

U.S. PATENT DOCUMENTS

| | | | | |
|---|---|---|---|---|
| 2022/0102413 | A1* | 3/2022 | Cho | H04N 25/704 |
| 2022/0190006 | A1* | 6/2022 | Shinohara | H10F 39/8053 |
| 2022/0344389 | A1* | 10/2022 | Pyo | H10F 39/8023 |
| 2022/0353446 | A1* | 11/2022 | Kim | H04N 25/11 |

FOREIGN PATENT DOCUMENTS

| | | | | |
|---|---|---|---|---|
| KR | 20210077264 | A | 6/2021 | |
| WO | WO-2019111919 | A1 * | 6/2019 | G02B 5/20 |

OTHER PUBLICATIONS

Miyata, M. et al., "High-Sensitivity Color Imaging Using Pixel-Scale Color Splitters Based on Dielectric Metasurfaces." ACS Photonics, 2019, 6, pp. 1442-1450.
Park, J. et al., "Free-form optimization of nanophotonic devices: from classical methods to deep learning." Nanophotonics 2022; 11(9); pp. 1809-1845.
Yun, S. et al., "Highly Efficient Color Separation and Focusing in the Sub-micron CMOS Image Sensor." IEDM, 2021, 4 pages.

* cited by examiner

IMAGE SENSING DEVICE INCLUDING OPTICAL ELEMENTS AND METHOD FOR MANUFACTURING THE SAME

CROSS-REFERENCE TO RELATED APPLICATION

This patent document claims the priority and benefits of Korean patent application No. 10-2023-0150751, filed on Nov. 3, 2023, the disclosure of which is incorporated herein by reference in its entirety as part of the disclosure of this patent document.

TECHNICAL FIELD

The technology and embodiments disclosed in this patent document generally relate to an image sensing device and a method for manufacturing the same, and more particularly to an image sensing device including one or more optical elements, and a method for manufacturing the same.

BACKGROUND

Image sensing devices are devices that capture images using the properties of semiconductors that respond to light. With the recent development of information technology (IT) industries and related technologies, the demand for high-quality, high-performance image sensing devices is rapidly increasing in various electronic devices such as smart-phones, digital cameras, etc.

Image sensing devices may be broadly classified into charge coupled device (CCD)-based image sensing devices and complementary metal oxide semiconductor (CMOS)-based image sensing devices. Recently, CMOS image sensing devices have been intensively researched and are coming into widespread use.

Recently, as the continuous miniaturization of image sensing devices is required and the demand for improved image sensing devices that can provide clearer images increases, research is being conducted to increase the quantum efficiency of such image sensing devices.

SUMMARY

In an embodiment of the disclosed technology, an image sensing device may include a plurality of microlenses including first to fourth microlenses arranged in a (2×2) matrix structure, a plurality of optical filters disposed under the first to fourth microlenses, and configured to correspond to the first to fourth microlenses, one microlens per optical filter, respectively, and an optical element disposed at a center of the (2×2) matrix structure among the first to fourth microlenses and configured to separate incident light into light rays of in different wavelength ranges of different colors to guide each of the light rays to one of the plurality of optical filters of a corresponding color.

In an embodiment of the disclosed technology, a method for manufacturing an image sensing device may include arranging first to fourth microlenses in a (2×2) matrix structure, arranging an optical element at a center of the (2×2) matrix structure, and forming first to fourth optical filters respectively corresponding to the first to fourth micro-lenses, wherein the optical element is configured to separate incident light into light rays corresponding to different colors and guides each of the light rays to one of the first to fourth optical filters of a corresponding color.

In an embodiment of the disclosed technology, an image sensing device may include first to fourth microlenses arranged in a (2×2) matrix structure, optical filters configured to correspond to the first to fourth microlenses, respectively, and an optical element disposed at a center of the (2×2) matrix structure and configured to separate incident light into lights for each color and to guide the separated light to an optical filter of a corresponding color.

In some implementations, the optical filters may include first to fourth optical filters, wherein the first optical filter is configured to transmit light of a first color, the second optical filter is configured to transmit light of a second color, the third optical filter is configured to transmit light of a third color, and the fourth optical filter is configured to transmit light of the first color.

In some implementations, the first color may be green, the second color may be red, and the third color may be blue.

In some implementations, the optical element may include a substrate formed of glass configured to include a first surface upon which the incident light is incident and a second surface facing or opposite to the first surface, wherein the second surface has a structure in which a plurality of nanoparticles is arranged in a predetermined pattern.

In some implementations, the predetermined pattern may be repeatedly disposed on the second surface at a certain interview (e.g., regular interval).

In some implementations, the plurality of nanoparticles may include at least one of gallium nitride, silicon nitride, and titanium dioxide.

In some implementations, each of the plurality of nanoparticles may be formed in a cylindrical shape.

In some implementations, the predetermined pattern (e.g., spectroscopic pattern) of the image sensing device may be a pattern in which the plurality of nanoparticles has the same height and two or more different diameters.

In some implementations, the plurality of nanoparticles may be formed in a polygonal pillar shape.

In some implementations, the predetermined pattern (e.g., spectroscopic pattern) of the image sensing device may be a pattern in which the plurality of nanoparticles has the same height and two or more different bottom surfaces.

In some implementations, the optical filters may include a first optical filter configured to transmit red light and a second optical filter configured to transmit blue light, and the predetermined pattern (e.g., spectroscopic pattern) may be a pattern in which a first region (e.g., spectroscopic region) in which the optical element overlaps the first optical filter contains much more nanomaterials than a second region (e.g., spectroscopic region) in which the optical element overlaps the second optical filter.

In some implementations, the plurality of nanoparticles may be arranged to have a height of 700 nm or less in a direction perpendicular to a substrate.

In some implementations, the optical element may be disposed to contact each of the first to fourth microlenses.

In another embodiment of the disclosed technology, a method for manufacturing an image sensing device may include: arranging first to fourth microlenses in a (2×2) matrix structure; arranging a optical element at a center of the (2×2) matrix structure, wherein the optical element separates incident light into lights for each color and respectively guides the separated lights to optical filters for corresponding colors; and forming first to fourth optical filters that are respectively included in the optical filters and respectively correspond to the first to fourth microlenses.

In some implementations, the method may further include designing a structure of the optical element using a program capable of optical simulation.

In some implementations, a method of the optical simulation may be any one of a finite difference time domain method, a finite element method, and a moment method.

In some implementations, the method may further include determining whether the structure of the optical element separates the incident light into lights for each color and respectively guides the separated lights to the optical filters of corresponding colors.

In some implementations, the method may further include designing a structure of the optical element using a program including deep learning technology.

In some implementations, the deep learning technology may be implemented using any one of a freeform design method, a genetic algorithm method, a particle swarm optimization method, and an adjacent method.

In some implementations, the method may further include determining whether the structure of the optical element separates the incident light into lights for each color and respectively guides the separated lights to the optical filters of corresponding colors.

In some implementations, the first optical filter may be configured to transmit light of a first color, the second optical filter may be configured to transmit light of a second color, the third optical filter may be configured to transmit light of a third color, and the fourth optical filter may be configured to transmit light of the first color.

In some implementations, the optical element may guide the first-color light included in the incident light to the first optical filter or the fourth optical filter, may guide the second-color light included in the incident light to the second optical filter, and may guide the third-color light included in the incident light to the third optical filter.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
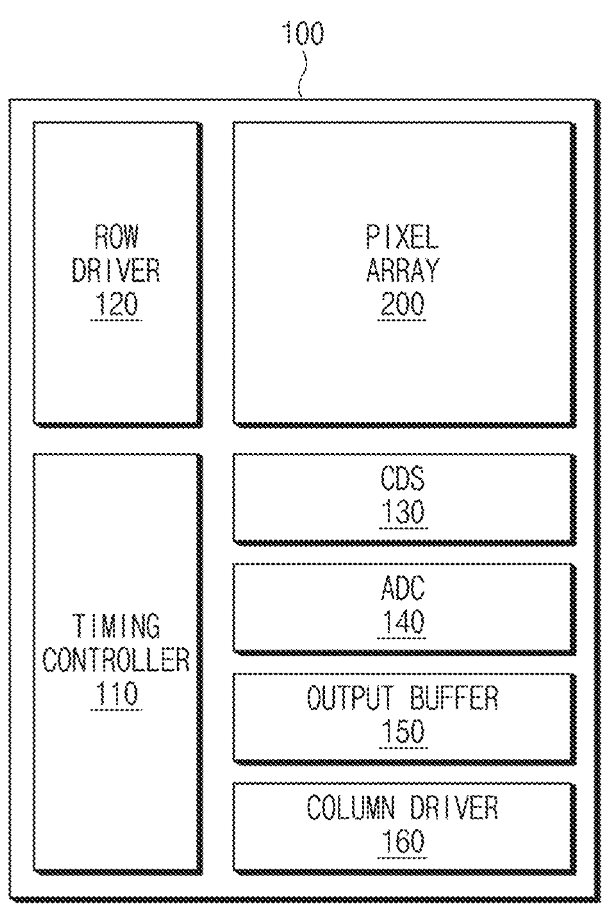
FIG. 1 is a block diagram illustrating an example of an image sensing device based on some implementations of the disclosed technology.

This patent document provides embodiments and examples of an image sensing device and a method for manufacturing the same, and more particularly to an image sensing device including one or more optical elements, and a method for manufacturing the same, that may be used in configurations to substantially address one or more technical or engineering issues and to mitigate limitations or disadvantages encountered in some other image sensing devices. Some embodiments of the disclosed technology relate to an image sensing device with increased quantum efficiency which is a ratio of the amount of light actually incident upon an image sensing device to the amount of light incident upon photoelectric conversion elements located inside pixels, and a method for manufacturing the same. In recognition of the issues above, the embodiments of the disclosed technology can provide the image sensing device with increased quantum efficiency and a method for designing an optical element capable of increasing quantum efficiency.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

In describing the components of the embodiments of the disclosed technology, various terms such as first, second, etc., may be used solely for the purpose of differentiating one component from another, but the essence, order and sequence of the components are not limited to these terms. Unless defined otherwise, all terms, including technical and scientific terms, used in the disclosed technology may have the same meaning as commonly understood by a person having ordinary skill in the art to which the disclosed technology pertains. It will be further understood that terms, such as those defined in commonly used dictionaries, may be interpreted as having a meaning that is consistent with their meaning in the context of the related art and the disclosed technology, and should not be interpreted in an idealized or overly formal sense unless expressly so defined herein.

Various embodiments of the disclosed technology relates to an image sensing device with increased quantum efficiency which is a ratio of the amount of light actually incident upon an image sensing device to the amount of light incident upon photoelectric conversion elements located inside pixels, and a method for manufacturing the same.

It is to be understood that both the foregoing general description and the following detailed description of the disclosed technology are illustrative and explanatory and are intended to provide further explanation of the disclosure as claimed.

FIG. 1 is a block diagram illustrating an example of an image sensing device 100 based on some implementations of the disclosed technology.

Referring to FIG. 1, the image sensing device 100 based on some implementations of the disclosed technology may include a timing controller 110, a row driver 120, a pixel array 200, a correlated double sampler (CDS) 130, an analog-to-digital converter (ADC) 140, an output buffer 150, and a column driver 160. The components of the image sensing device illustrated in FIG. 1 are discussed by way of example only, and this patent document encompasses numerous other changes, substitutions, variations, alterations, and modifications. In this patent document, the word "pixel" can be used to indicate an image sensing pixel that is structured to detect incident light to generate electrical signals carrying images in the incident light.

The timing controller 110 may provide timing signals and control signals to at least one of the row driver 120, the correlated double sampler (CDS) 130, the ADC 140, the output buffer 150, and the column driver 160.

The row driver 120 may activate the pixel array 200 to perform specific operations on pixels included in a corresponding row based on the timing and control signals received from the timing controller 110.

In some implementations, the row driver 120 may select at least one pixel arranged in at least one row of the pixel array 200, and may provide the selected pixel with a control signal for performing a specific operation. The row driver 120 may generate a row selection signal to select at least one row from among a plurality of rows. When the row driver 120 selects a specific row from among the plurality of rows to perform a specific operation, the row driver 120 may not perform the specific operation on a row adjacent to the selected specific row.

The pixels of the row selected by the row driver 120 may sequentially transfer analog reference signals and image signals to the correlated double sampler (CDS) 130. The reference signal may be an electrical signal provided to the CDS 130 when a floating diffusion region of each pixel is reset to a power-supply voltage VDD. The image signal may be an electrical signal provided to the CDS 130 when photocharges generated by each pixel are accumulated in the floating diffusion (FD) region.

The reference signal may be a signal indicating unique pixel noise of each pixel, and the reference signal and the image signal may be collectively referred to as a pixel signal as necessary.

The pixel array 200 may include a plurality of pixels arranged in a plurality of rows and a plurality of columns. The plurality of pixels may be connected to the row driver 120 through a plurality of row lines extending in the row direction. The plurality of pixels may be connected to the CDS 130 through a plurality of column lines extending in the column direction.

For example, the pixel array 200 may be arranged in a two-dimensional (2D) pixel array in which a plurality of unit pixels includes rows and columns. As another example, the pixel array 200 may include rows and columns, and may be a three-dimensional (3D) pixel array in which pixels are arranged in a 3D shape including a third direction different from the row direction and the column direction.

A plurality of pixels included in the pixel array 200 may convert an optical signal into an electrical signal in units of pixels, in units of subpixels included in each pixel, and/or in units of a pixel group having the pixels, and the pixels included in the pixel group may share a specific internal pixel circuit.

The pixel array 200 may receive a pixel control signal including a row selection signal, a pixel reset signal, a row transfer signal, etc. from the row driver 120. At least one pixel included in the row that is selected by the row driver 120 according to the pixel control signal may perform a specific operation in response to the row selection signal, the pixel reset signal, and the row transfer signal.

The CDS 130 may receive the reference signal and the image signal, each of which corresponds to the columns of the pixel array 200, and may sample levels of the reference signal and the image signal. In the image sensing device designed to use CMOS(s), the CDS 130 may sample a pixel signal twice to remove a difference between these two samples, and may perform correlated double sampling to remove undesired offset values of pixels such as fixed noise. For example, the CDS 130 may compare pixel output voltages obtained before and after photocharges generated by incident light are accumulated in the floating diffusion region to remove undesired offset values, so that the pixel output voltages based on the incident light can be measured.

The CDS 130 may transmit reference signals and image signals, which are generated in columns based on a timing signal and a control signal of the timing controller 110, to the ADC 140 as CDS signals.

The ADC 140 may convert analog CDS signals received from the CDS 130 into digital signals, and may output the resultant digital signals.

The output buffer 150 may temporarily hold and output digital signals provided from the ADC 140.

The column driver 160 may select columns from the output buffer 150 based on a timing signal and a control signal of the timing controller 110, and may control the temporarily held digital signals to be output according to the selection order.

Figure 2:
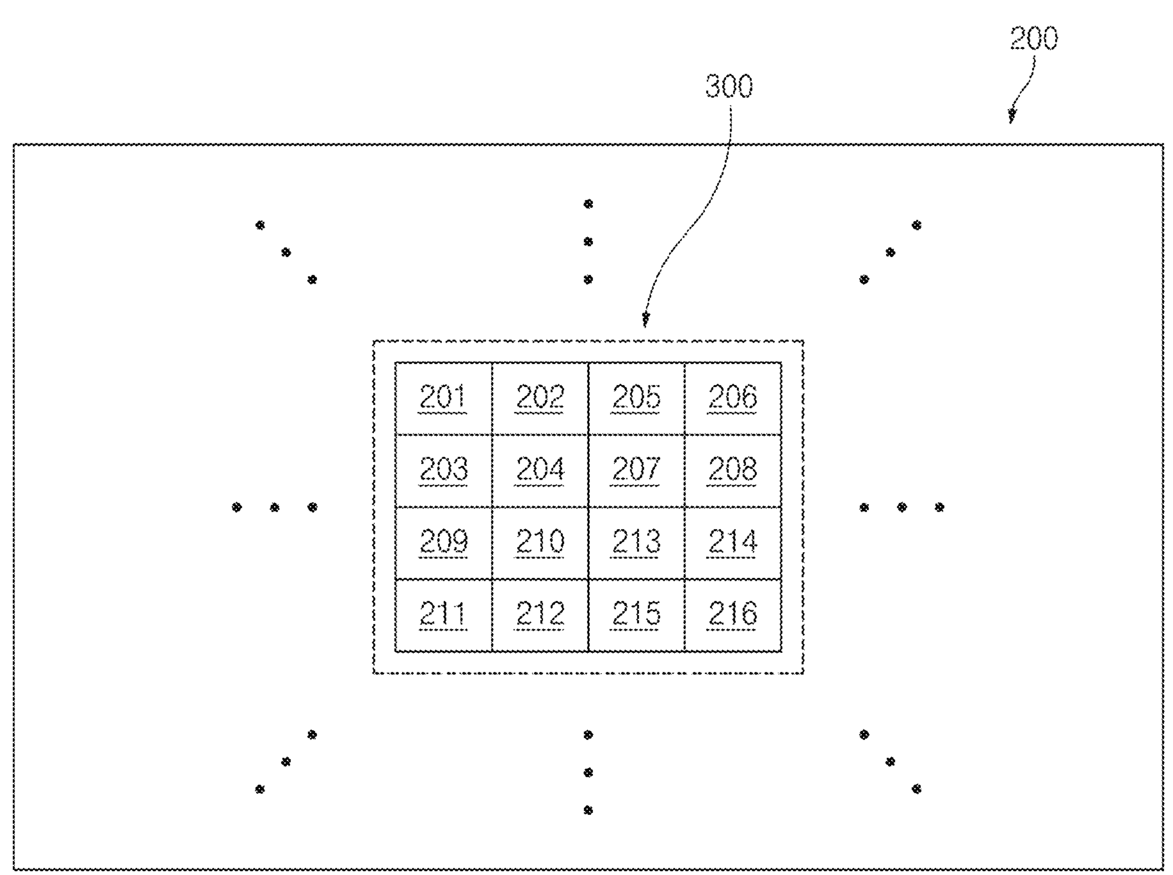
FIG. 2 is a plan view illustrating an example of a pixel array shown in FIG. 1 based on some implementations of the disclosed technology.

FIG. 2 is a plan view illustrating an example of the pixel array 200 shown in FIG. 1 based on some implementations of the disclosed technology.

Referring to FIG. 2, the pixel array 200 may include a structure in which a plurality of pixels is disposed adjacent to each other. In a portion 300 of the pixel array 200 shown in FIG. 2, first to sixteenth pixels 201-216 may be arranged in a (4×4) matrix structure.

Although the first to sixteenth pixels 201-216 shown in FIG. 2 have rectangular shapes having the same size, other implementations are also possible, and it should be noted that the pixel array 200 may include pixels having different sizes or different shapes as necessary. For example, the pixel array 200 may include octagonal pixels and rectangular pixels.

Although only sixteen pixels 201-216 are illustrated in the pixel array 200 in FIG. 2 for convenience of description, more pixels may also be arranged in a row direction indicating a horizontal direction of FIG. 2 and in a column direction indicating a vertical direction of FIG. 2.

The first to sixteenth pixels 201-216 will be further described in detail with reference to FIG. 3.

Figure 3:
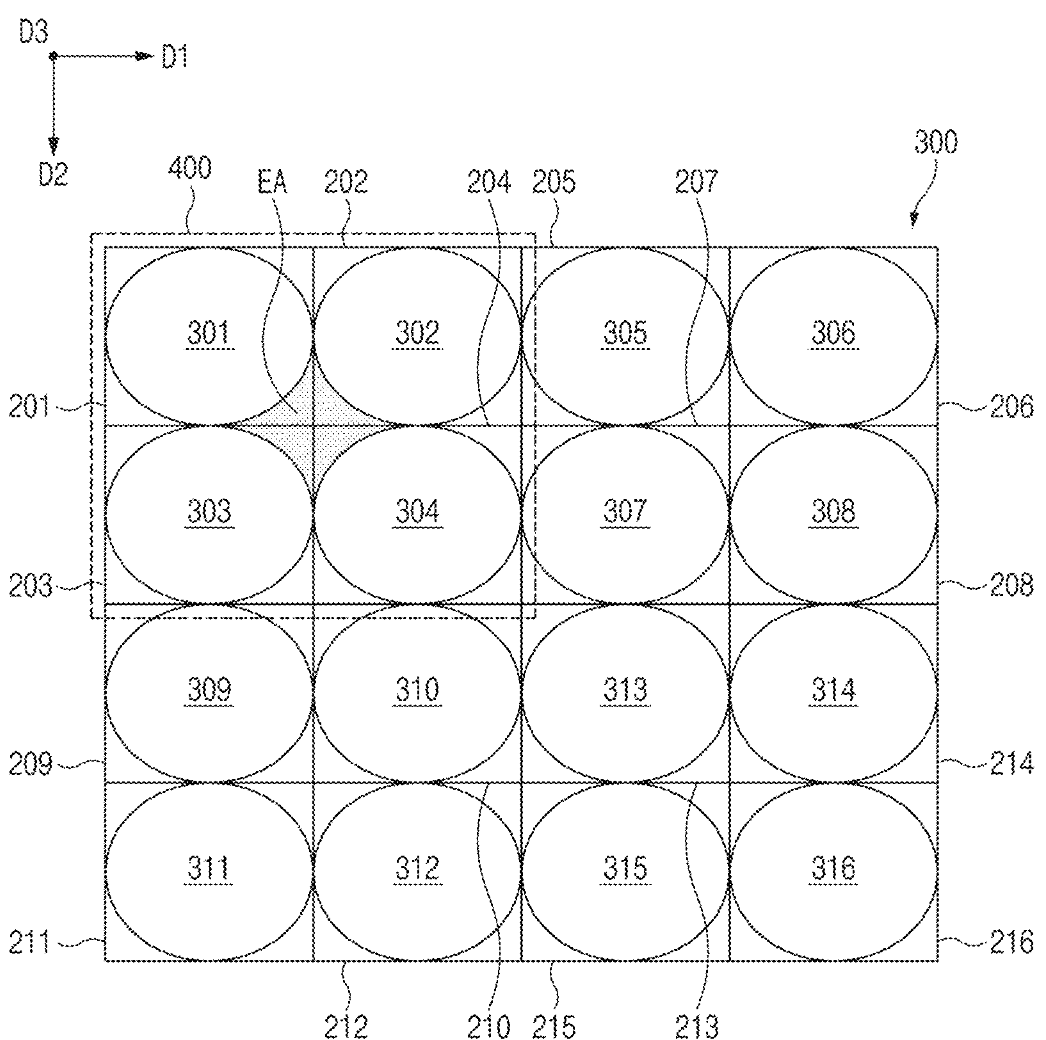
FIG. 3 is a plan view illustrating an example of a portion of the pixel array shown in FIG. 2 based on some implementations of the disclosed technology.

FIG. 3 is a plan view illustrating an example of a portion 300 of the pixel array 200 shown in FIG. 2 based on some implementations of the disclosed technology.

Referring to FIGS. 2 and 3, the first to sixteenth pixels 201-216 may include first to sixteenth microlenses 301-316, respectively. For example, the first pixel 201 may include a first microlens 301, and the second pixel 202 may include a second microlens 302. In some implementations, the first to sixteenth microlenses 301-316 may represent convex portions of a microlens array.

The first to sixteenth microlenses 301-316 may be arranged on the same plane. The first to sixteenth microlenses 301-316 may concentrate light incident in a third direction D3 onto the first to sixteenth pixels 201-216, respectively. The first to sixteenth microlenses 301-316 may have the same shape and size. Each of the first to sixteenth microlenses 301-316 may have an external shape (e.g., a circular hemisphere or an oval hemisphere) surrounded by a line with a curvature.

Each of the first to sixteenth microlenses 301-316 may be in contact with microlenses of adjacent pixels. For example, the first microlens 301 may be in contact with the second microlens 302 in a first direction D1, and the first microlens 301 may be in contact with the third microlens 303 in a second direction D2.

The first to fourth microlenses 301-304, which are examples of four microlenses arranged in a (2×2) matrix structure, may form an empty space (EA) between the first to fourth microlenses.

The empty space (EA) may refer to a space surrounded by the first to fourth microlenses 301-304 in a situation where the first microlens 301 is in contact with the second microlens 302 in the first direction D1, the first microlens 301 is in contact with the third microlens 303 in the second direction D2, the second microlens 302 is in contact with the fourth microlens 304 in the second direction D2, and the third microlens 303 is in contact with the fourth microlens 304 in the first direction D1.

In FIG. 3, only one empty space surrounded by the first to fourth microlenses 301-304 is labeled with "EA," other empty spaces between the first to sixteenth microlenses 301-316 are all the empty space (EA).

Light incident in the third direction D3 may enter not only the first to sixteenth microlenses 301-316 but also the empty space (EA). Light incident upon the empty space (EA) may not be guided to any of the first to sixteenth pixels 201-216.

As the amount of light rays that are not guided to the first to sixteenth pixels 201-216 increases, quantum efficiency may decrease and the level of electrical signals output from the pixel may decrease.

Figure 4:
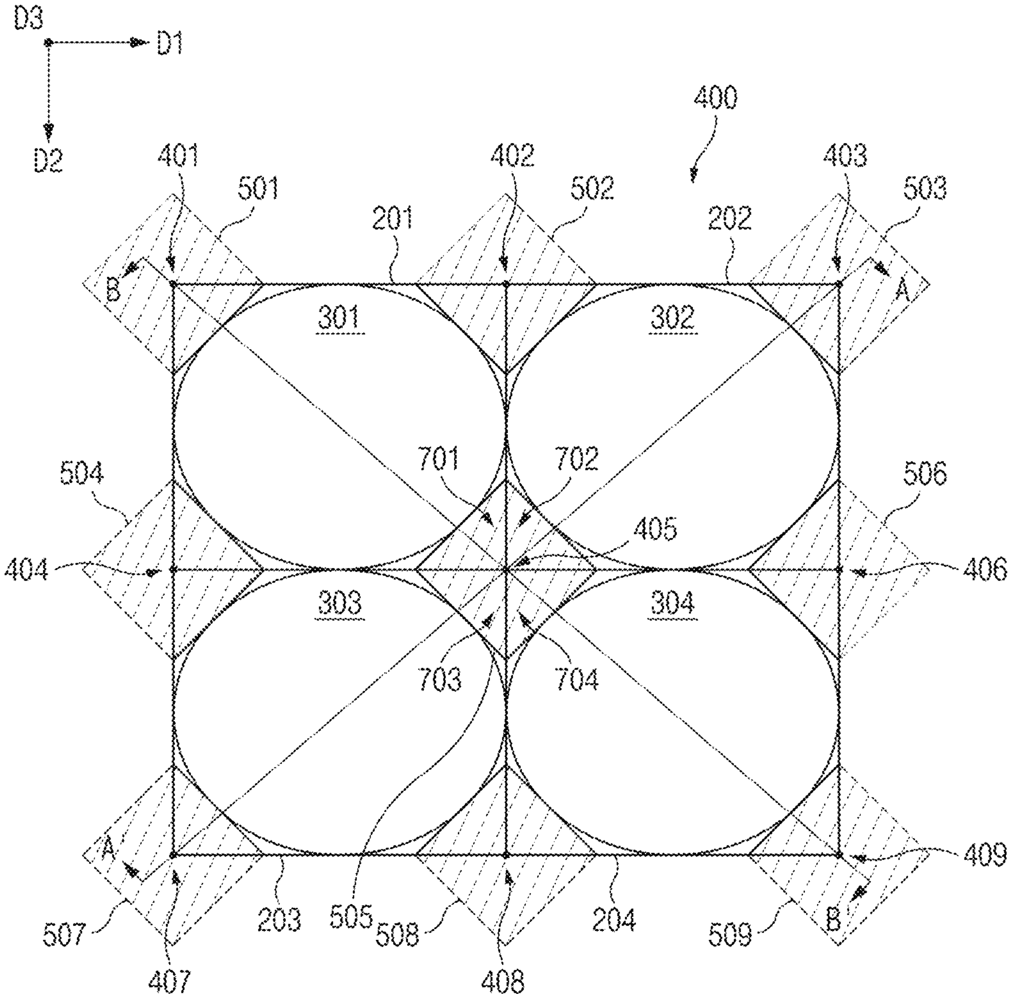
FIG. 4 is a plan view illustrating an example of a pixel group shown in FIG. 3 based on some implementations of the disclosed technology.

FIG. 4 is a plan view illustrating an example of the pixel group 400 shown in FIG. 3 based on some implementations of the disclosed technology.

Referring to FIGS. 2 to 4, the pixel group 400 may include the first to fourth pixels 201-204 shown in FIG. 3. In FIG. 4, the empty space (EA) shown in FIG. 3 is omitted to avoid confusion.

The pixel group 400 shown in FIG. 4 may include first to fourth pixels 201-204, first to fourth microlenses 301-304, first to ninth intersection points 401-409, and first to ninth meta lenses 501-509.

The first to the ninth meta lenses 501-509 may be optical elements having characteristics of refracting light of a specific range of wavelengths in a specific light path.

The first pixel 201 may be in contact with the second pixel 202 in the first direction D1. The first pixel 201 may be in contact with the third pixel 203 in the second direction D2. The second pixel 202 may be in contact with the fourth pixel 204 in the second direction D2. The third pixel 203 may be in contact with the fourth pixel 204 in the first direction D1. For example, the first to fourth pixels 301-304 may be arranged in a (2×2) matrix structure with an RGB Bayer pattern.

The first to fourth microlenses 301-304 may be arranged in a (2×2) matrix structure, as described in FIG. 3. The first microlens 301 may be in contact with the second microlens 302 in the first direction D1, the first microlens 301 may be in contact with the third microlens 303 in the second direction D2, the second microlens 302 may be in contact with the fourth microlens 304 in the second direction D2, and the third microlens 303 may be in contact with the fourth microlens 304 in the first direction D1.

The first to ninth intersection points 401-409 may be contact points shared by four adjacent pixels arranged in a (2×2) matrix structure. For example, the first to fourth pixels 201-204 may be arranged in a (2×2) matrix structure, and the first to fourth pixels 201-204 may share a contact point that can be referred to as a fifth intersection 405.

The centers of the first to ninth meta lenses 501-509 may overlap the first to ninth intersection points 401-409, respectively. The first to ninth meta lenses 501-509 may be disposed in the empty space (e.g., EA in FIG. 3) in which the first to fourth microlenses 301-304 are not disposed.

Taking the fifth meta lens 505 as a representative example, the center of the fifth meta lens 505 may overlap the fifth intersection point 405. The fifth meta lens 505 may be disposed in the empty space (e.g., EA in FIG. 3) surrounded by the first to fourth microlenses 301-304. The fifth meta lens 505 may be in contact with each of the first to fourth microlenses 301-304.

The fifth meta lens 505 may divide light incident in the third direction D3 into light beams by color, and may guide the separated light beams to the first to fourth pixels 201-204, respectively. In some implementations, the separated light beams are guided to the pixels 201-204 as will be discussed below with reference to the drawings below FIG. 5.

The above description of the fifth meta lens 505 may be applied to the first to fourth meta lenses 501-504 and the sixth to ninth meta lenses 506-509.

A region in which the fifth meta lens 505 and the first pixel 201 overlap each other in the third direction D3 may be a first spectroscopic region 701. A region in which the fifth meta lens 505 and the second pixel 202 overlap each other in the third direction D3 may be a second spectroscopic region 702. A region in which the fifth meta lens 505 and the third pixel 203 overlap each other in the third direction D3 may be a third spectroscopic region 703. A region in which the fifth meta lens 505 and the fourth pixel 204 overlap each other in the third direction D3 may be a fourth spectroscopic region 704.

Figure 5:
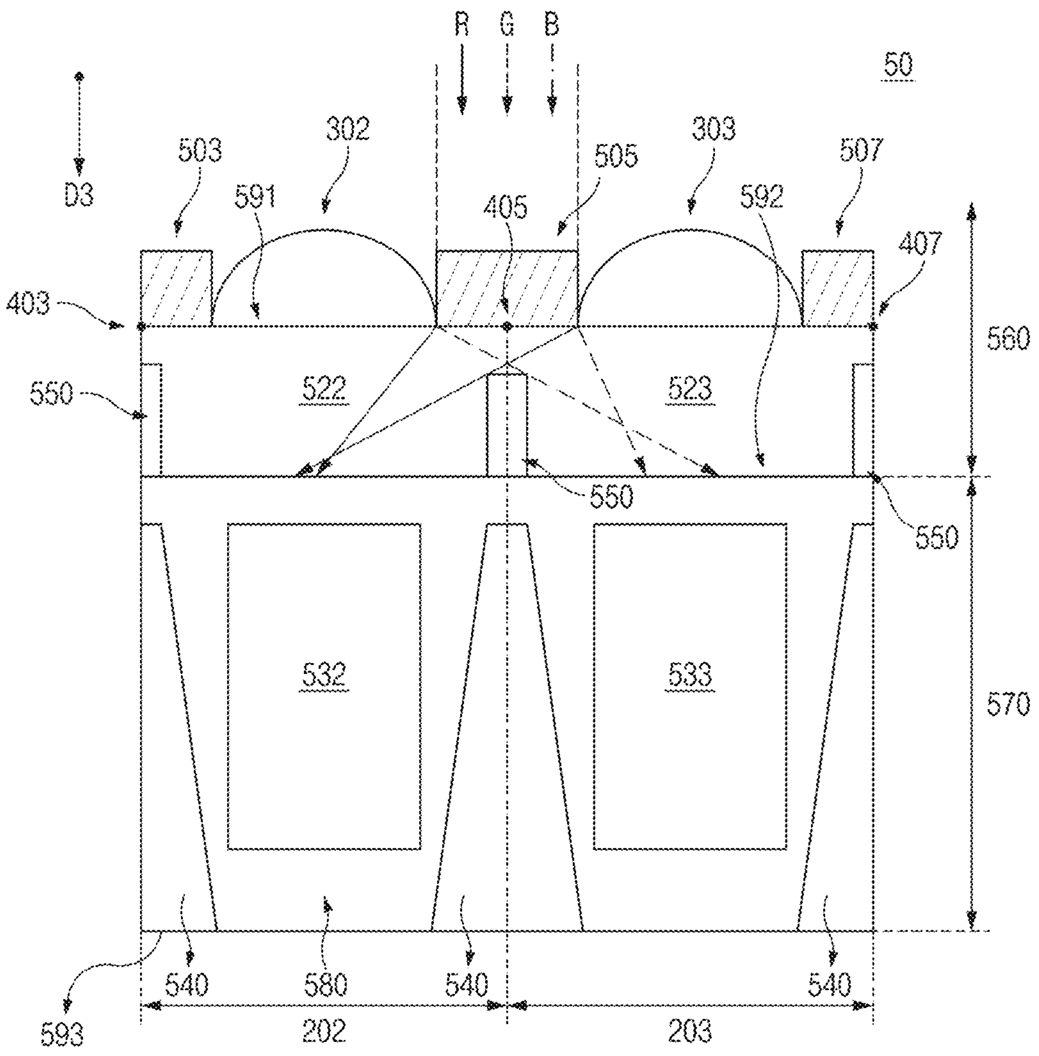
FIG. 5 is a cross-sectional view illustrating an example of the pixel group taken along the line A-A' of FIG. 4 based on some implementations of the disclosed technology.

FIG. 5 is a cross-sectional view illustrating an example of the pixel group 400 taken along the line A-A' of FIG. 4 based on some implementations of the disclosed technology.

Figure 6:
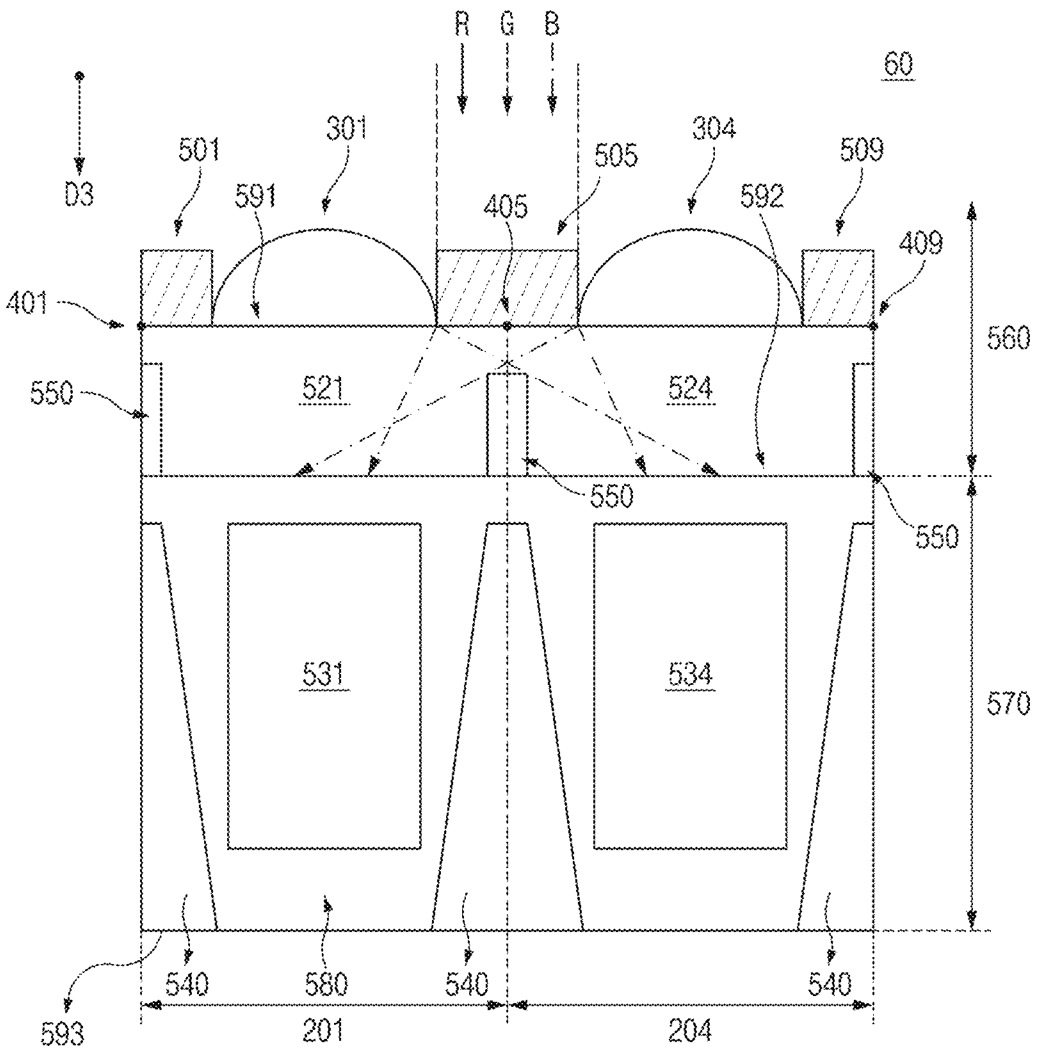
FIG. 6 is a cross-sectional view illustrating an example of the pixel group taken along the line B-B' of FIG. 4 based on some implementations of the disclosed technology.

FIG. 6 is a cross-sectional view illustrating an example of the pixel group 400 taken along the line B-B' of FIG. 4 based on some implementations of the disclosed technology.

Referring to FIGS. 4 to 6, a first cross-section 50 taken along the line A-A' of FIG. 4 may include a light incident layer 560 and a semiconductor substrate 570, and a second cross-section 60 taken along line B-B' of FIG. 4 may also include a light incident layer 560 and a semiconductor substrate 570.

The light incident layer 560 may include first, third, fifth, seventh, and ninth meta lenses 501, 503, 505, 507, 509, first to fourth microlenses 301-304, first to fourth optical filters 521-524, and a grid structure 550.

The first, third, fifth, seventh, and ninth meta lenses 501, 503, 505, 507, 509 may separate incident light into light beams by color, and may focus the separated light beams onto adjacent pixels.

Hereinafter, to avoid duplication of explanation, the fifth meta lens 505 will be described by way of example. In order to avoid overcomplicating the drawings in FIGS. 5 and 6, the fact that the first, third, seventh, and ninth meta lenses 501, 503, 507, 509 separate the incident light into light beams for each color and guide the separated light beams is not shown in FIGS. 5 and 6.

The first microlens 301 may guide light incident in the third direction D3 to a first optical filter 521. The first microlens 301 may be located between the first meta lens 501 and the fifth meta lens 505, and may be disposed over a microlens layer 591.

The second microlens 302 may guide light incident in the third direction D3 to the second optical filter 521. The second microlens 302 may be located between the third meta lens 503 and the fifth meta lens 505, and may be disposed over the microlens layer 591.

The third microlens 303 may guide light incident in the third direction D3 to the third optical filter 523. The third microlens 303 may be located between the fifth meta lens 505 and the seventh meta lens 507, and may be disposed over the microlens layer 591.

The fourth microlens 304 may guide light incident in the third direction D3 to the fourth optical filter 524. The fourth microlens 304 may be located between the fifth meta lens 505 and the ninth meta lens 509, and may be disposed over the microlens layer 591.

The first optical filter 521 may transmit light rays of the first color out of the incident light. The first optical filter 521 may be disposed in the third direction D3 from the first microlens 301. Light rays guided from the first microlens 301 may include light rays of the first color and light rays of other colors, and the first optical filter 521 may transmit light rays of the first color (hereinafter referred to as "first-color light"). The first optical filter 521 may transmit the first-color light guided from the fifth meta lens 505, as will be described later. For example, the first color may be green.

The second optical filter 522 may transmit light rays of the second color out of the incident light. The second optical filter 522 may be disposed in the third direction D3 from the second microlens 302. Light rays guided from the second microlens 302 may include light rays of the second color and light rays of other colors, and the second optical filter 522 may transmit light rays of the second color (hereinafter referred to as "second-color light"). The second optical filter 522 may transmit the second-color light guided from the fifth meta lens 505, as will be described later. For example, the second color may be red.

The third optical filter 523 may transmit light rays of the third color out of the incident light. The third optical filter 523 may be disposed in the third direction D3 from the third microlens 303. Light rays focused from the third microlens 303 may transmit light rays of the third color (hereinafter referred to as "third-color light"). The third optical filter 523 may transmit the third-color light guided from the fifth meta lens 505, as will be described later. For example, the third color may be blue.

The fourth optical filter 524 may transmit light rays of the first color (i.e., first-color light) out of the incident light. The fourth optical filter 524 may be disposed in the third direction D3 from the fourth microlens 304. Light rays guided from the fourth microlens 304 may transmit light rays of the first color (i.e., first-color light). The fourth optical filter 524 may transmit the first-color light guided from the fifth meta lens 505, as will be described later.

The first to fourth optical filters 521-524 may be disposed on a back surface 592 of the semiconductor substrate 570.

A grid structure 550 may distinguish optical filters between adjacent pixels. The grid structure 550 may prevent light refracted through the first to fourth microlenses 301-304 from entering other adjacent pixels. For example, the grid structure 550 may prevent light incident upon the second microlens 302 from entering a third optical filter 523 or a third photoelectric conversion element 533 of the third pixel 203.

The semiconductor substrate 570 may include first to fourth photoelectric conversion elements 531-534, a pixel isolation structure 540, and a silicon region 580.

The semiconductor substrate 570 may have a back surface 592, which is a surface upon which light is incident, and a front surface 591, which is a surface opposite to the back surface 592.

A plurality of interconnects, a plurality of transistors, and a plurality of doped regions, which may be arranged in the third direction D3 on a front surface 591, are omitted to avoid overcomplicating the drawing.

The first photoelectric conversion element 531 may generate photocharges in response to light having penetrated the first optical filter 521. The first photoelectric conversion element 531 may be formed by doping a portion of the semiconductor substrate 570 with impurities.

The second photoelectric conversion element 532 may generate photocharges in response to light having penetrated the second optical filter 522. The second photoelectric conversion element 532 may be formed by doping a portion of the semiconductor substrate 570 with impurities.

The third photoelectric conversion element 533 may generate photocharges in response to light having penetrated the third optical filter 523. The third photoelectric conversion element 533 may be formed by doping a portion of the semiconductor substrate 570 with impurities.

The fourth photoelectric conversion element 534 may generate photocharges in response to light having penetrated the fourth optical filter 524. The fourth photoelectric conversion element 534 may be formed by doping a portion of the semiconductor substrate 570 with impurities.

The pixel isolation structure 540 may block light having penetrated any one of the first to fourth optical filters 521-524 from entering the photoelectric conversion element of another adjacent pixel, and may thus optically isolate (or separate) adjacent pixels from each other. The pixel isolation structure 540 may be formed as a recessed structure that is formed to be recessed in the semiconductor substrate 570 in the third direction D3 from the back surface 592, and may be formed as a recessed structure that is formed to be recessed in a direction opposite to the third direction D3 from the front surface 593. FIGS. 5 and 6 illustrate examples of the pixel isolation structure 540 formed as a recessed structure within the semiconductor substrate 570 in a direction opposite to the third direction D3 from the front surface 593. The pixel isolation structure 540 may be formed to penetrate the semiconductor substrate 570, unlike the examples shown in FIGS. 5 and 6.

The fifth meta lens 505 may separate incident light by color, and may guide the separated light to an optical filter that transmits light of the corresponding color.

Arrows corresponding to different colors ("R" indicate red, "B" indicate blue, "G" indicates green) in FIGS. 5 and 6 may indicate example cases in which incident light including light of a first color (e.g., green), light of a second color (e.g., red, and light of a third color (e.g., blue) are respectively incident upon pixels. In more detail, the arrow denoted by "R" may indicate an example case in which light of the first color (e.g., green light) enters the pixel, the arrow denoted by "G" may indicate an example case in which light of the second color (e.g., red light) enters the pixel, and the arrow denoted by "B" may indicate an example case in which light of the third color (e.g., blue light) enters the pixel. For example, the first-color light may be light having a wavelength of 500 nm to 600 nm. For example, the second color light may be light having a wavelength of 600 nm to 700 nm. For example, the third color light may be light having a wavelength of 400 nm to 500 nm.

Referring to FIGS. 4 and 5, the fifth meta lens 505 may guide the second-color light (R) to the second optical filter 522. The fifth meta lens 505 may guide the third color light (B) to the third optical filter 523.

Referring to FIGS. 4 and 6, the fifth meta lens 505 may guide the first-color light (G) to the first optical filter 521 or the fourth optical filter 524.

A detailed description of the fifth meta lens 505 will be given with reference to the drawings below FIG. 7A.

Figure 7A:
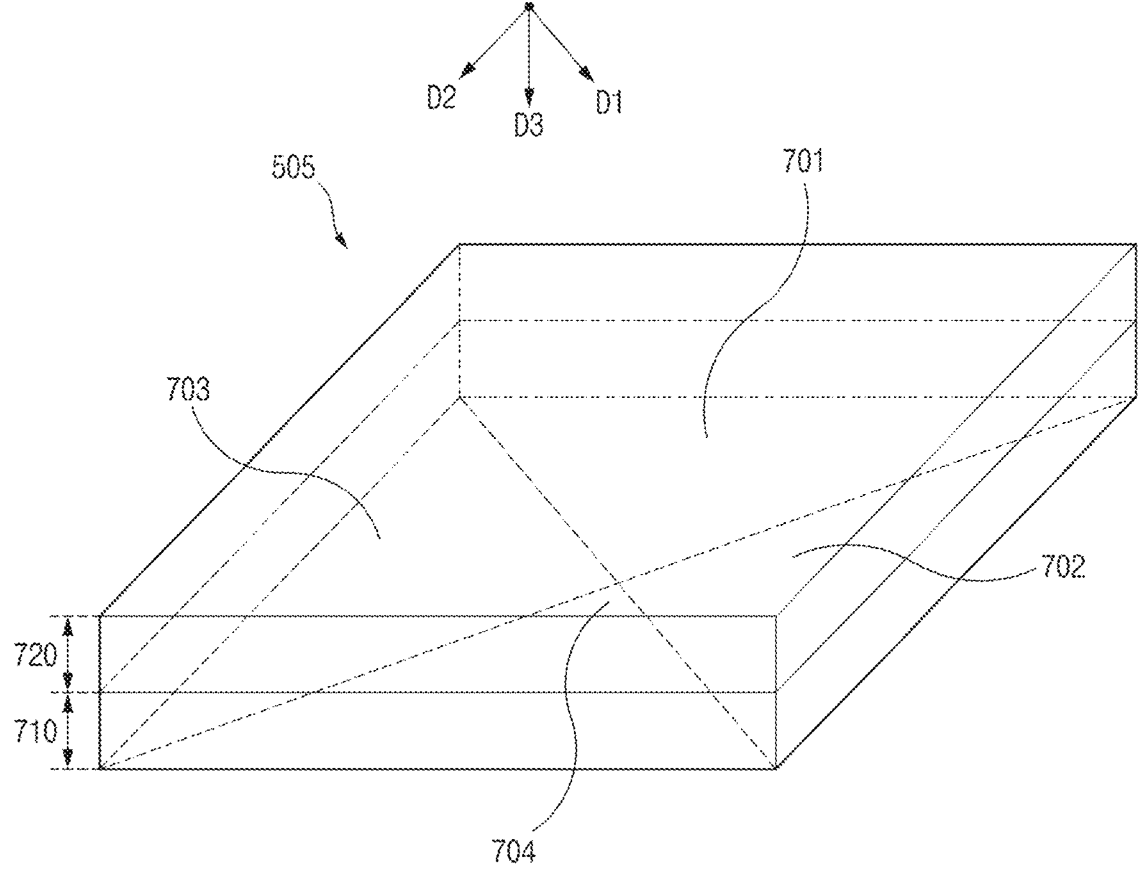
FIG. 7A is a diagram briefly illustrating an example of a three-dimensional (3D) structure of a meta lens shown in FIG. 4 based on some implementations of the disclosed technology.

FIG. 7A is a diagram briefly illustrating an example of a three-dimensional (3D) structure of the meta lens shown in FIG. 4 based on some implementations of the disclosed technology.

Figure 7B:
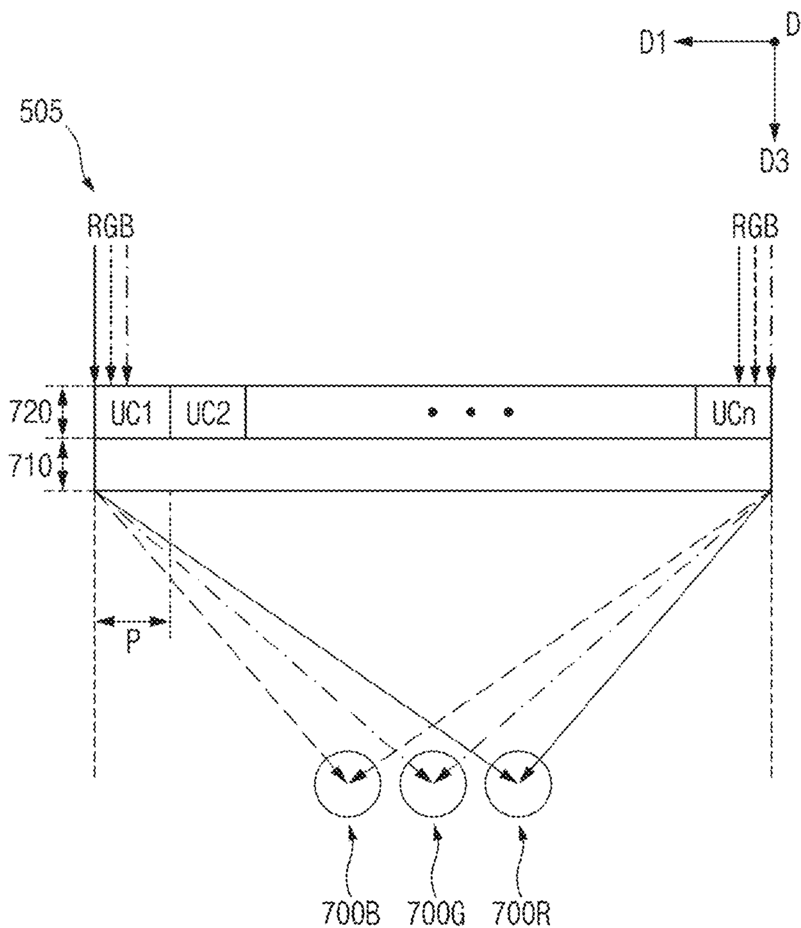
FIG. 7B is a diagram illustrating an example of a light guide of the meta lens shown in FIG. 4 based on some implementations of the disclosed technology.

FIG. 7B is a diagram illustrating an example of a light guide of the meta lens shown in FIG. 4 based on some implementations of the disclosed technology.

Hereinafter, the fifth meta lens 505 from among the first to ninth meta lenses 501-509 of FIG. 4 will be exemplarily described in detail.

Referring to FIGS. 7A and 7B, the fifth meta lens 505 may include a nano thin film layer 710 and a nanomaterial layer. Among the bottom surfaces of the nano thin film layer 710, a surface located farther downward in the third direction D3 may be a surface adjacent to the fifth meta lens 505 and the microlens layer 591 of FIGS. 5 and 6.

When viewed in the third direction D3, the bottom surface of the fifth meta lens 505 formed to overlap the first pixel 201 may be a first spectroscopic region 701, the bottom surface of the fifth meta lens 505 formed to overlap the second pixel 202 may be a second spectroscopic region 702, the bottom surface of the fifth meta lens 505 formed to overlap the third pixel 203 may be a third spectroscopic region 703, and the bottom surface of the fifth meta lens 505 formed to overlap the fourth pixel 204 may be a fourth spectroscopic region 704.

Referring to FIGS. 5 and 7A, the nano thin film layer 710 in FIG. 7A for the meta lens 505 in FIG. 5A may support the nanomaterial layer 720 on the top, and a distance between the nanomaterial layer 720 and the microlens layer 591 can be maintained as high as the height of the nanomaterial layer 710 arranged in the third direction D3. The nano thin film layer 710 may have a low absorption rate for light with a wavelength of 400 nm to 700 nm, which can be seen as a wavelength band of visible light. As light transmittance of the nano thin film layer 710 increases, quantum efficiency of each pixel may increase. The nano thin film layer 710 may include a material with a lower refractive index than the nanomaterial included in the nanomaterial layer 720. The nano thin film layer 710 may include a transparent material. For example, the nano thin film layer 710 may include silicon dioxide or polymethyl methacrylate (PMMA). The height of the nano thin film layer 710 arranged in the third direction D3 may be expressed as:

$$T = np^2/\lambda_G - \lambda_G/4n \quad \text{[Equation 1]}$$

In Equation 1, "T" may be the height of the nano thin film layer 710, "n" may be a refractive index of nanomaterials, "p" may be a period in which a predetermined pattern is repeated as a periodic structure, and $\lambda_G$ may be a wavelength (e.g., 550 nm) of green light. The nanomaterial layer 720 may include a plurality of nanoparticles. The height of the plurality of nanoparticles in the third direction D3 may be, for example, 700 nm or less.

The nanomaterial layer 720 may include two or more nanomaterials (which may also include air) having different refractive indices. The nanomaterial layer 720 may include at least one of various nanomaterials, for example, titanium dioxide (having a refractive index ranging from 2.57 to 2.76), silicon nitride (having a refractive index ranging from 2.04 to 2.07), or gallium nitride (having a refractive index ranging from 2.38 to 2.46). For example, the nanomaterial layer 720 may have a structure in which nanoparticles containing titanium dioxide and nanoparticles containing silicon dioxide are arranged in a predetermined periodic pattern. Nanoparticles may be arranged in a predetermined periodic pattern to achieve a desired operational effect. A region in which the nanoparticles are not disposed may include a material (e.g., air) with a lower refractive index than the nanomaterial. For example, when titanium dioxide is used as the nanomaterial of the nanomaterial layer 720, a region formed by excluding a portion corresponding to the predetermined pattern from the titanium dioxide layer may be removed through an etching process, resulting in formation of the nanomaterial layer 720. Even in the embodiment in which silicon dioxide, rather than air, is used as a material with a lower refractive index than the nanomaterial, the etching process using a patterning mask may be used to create a nanomaterial layer 720 in which titanium dioxide and silicon dioxide are arranged according to a predetermined pattern.

Referring to FIGS. 7A and 7B, when incident light including green light (G), red light (R), and blue light (B) passes through the nanomaterial layer 720 and the nano thin film layer 710 in the third direction D3, the incident light may be refracted in different directions.

At the bulk scale, light incident perpendicularly upon the surface is unlikely to be refracted. However, at the nano-scale, light incident perpendicularly upon the surface may have different refraction angles depending on the wavelength of light. At the nano-scale, the refraction angle may vary depending on the wavelength of incident light and the period in which nanoparticles with a predetermined pattern are arranged.

For light incident perpendicularly upon the fifth meta lens 505, the period (p) of a predetermined periodic pattern of nanoparticles disposed in the nanomaterial layer 720 and the refraction angle according to the wavelength of the incident light can be expressed as:

$$\sin\theta_t \propto \lambda_{in}/p \quad \text{[Equation 2]}$$

In Equation 2, $\theta_t$ may denote the refraction angle, $\lambda_{in}$ may denote the wavelength of incident light, and 'p' may denote the period of the predetermined periodic pattern. The period of the predetermined periodic pattern may mean a period in the direction in which the predetermined pattern is repeatedly arranged. In the case of light wavelength, the wavelength of red light is longer than the wavelength of green light, and the wavelength of green light is longer than the wavelength of blue light. The above the refractive index of the red light is smaller than the refractive index of the green light, and the refractive index of the green light is smaller than the refractive index of the blue light.

The nanomaterial layer 720 may include one or more predetermined periodic patterns of different periods. FIG. 7B illustrates an example of the nanomaterial layer 720 in which a predetermined pattern is repeated N times (where N is a natural number). A first unit pattern UC1 may have a period "p." For example, a second unit pattern UC2 having the same pattern as the first unit pattern UC1 may be disposed to contact the first unit pattern UC1. In another example, according to another embodiment in which the period is increased to "2p," a gap (or distance) of 'p' in the first direction D1 may be provided between the first unit pattern UC1 and the second unit pattern UC2. The first to N-th unit patterns UC1-UCn may be arranged in the first direction D1. The direction in which light is repeatedly arranged is not limited to the first direction D1, and the direction in which light is repeatedly arranged may be different depending on a unit pattern or the location where each separated light is to be focused. In some implementations, the heights of the nanoparticles disposed in the nanomaterial layer 720 in the third direction D3 may be constant. In some other implementations, the heights of the nanoparticles disposed in the nanomaterial layer 720 in the third direction D3 may be different from each other.

Each of green light (G), red light (R), and blue light (B), each of which is refracted by the nanomaterial layer 720, may penetrate the nano thin film layer 710. Green light (G), red light (R), and blue light (B) have different refraction angels, so that the green light (G), the red light (R), and the blue light (B) may be guided in different directions from each other.

As can be seen in FIG. 7B, green light (G) may be focused onto a green focus region 700G, red light (R) may be focused onto a red focus region 700R, and blue light (B) may be focused onto a blue focus region 700B. The position of the region on which green light (G) is to be focused, the position of the region on which red light (R) is to be focused, and the position of the region on which blue light (B) is to be focused can be adjusted according to arrangement of the first to N-th unit patterns UC1-UCn.

Figure 8A:
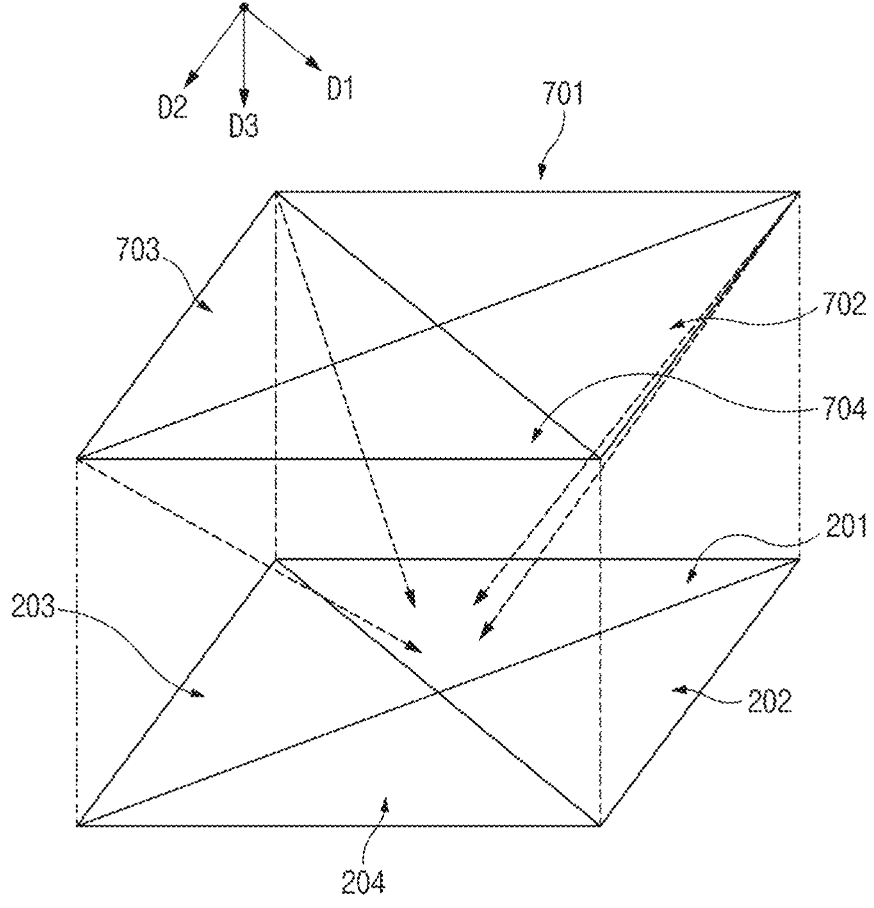
FIGS. 8A to 8C are diagrams illustrating examples of a phenomenon in which light separated by the meta lens of FIG. 4 is guided based on some implementations of the disclosed technology.
Figure 8B:
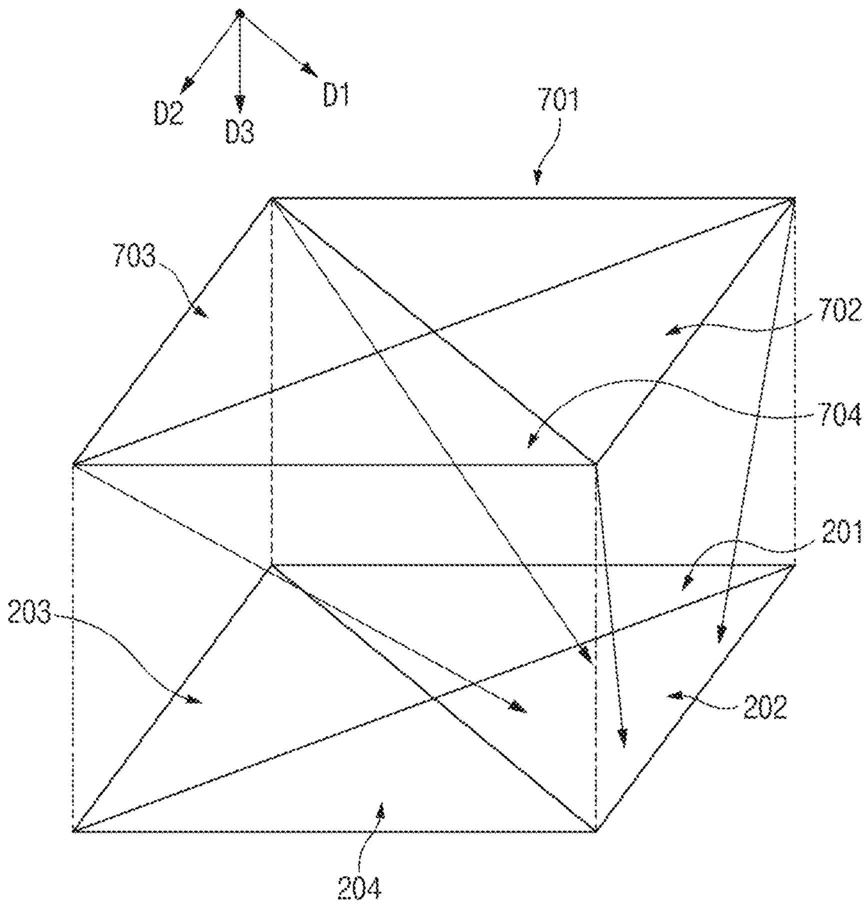
Figure 8C:
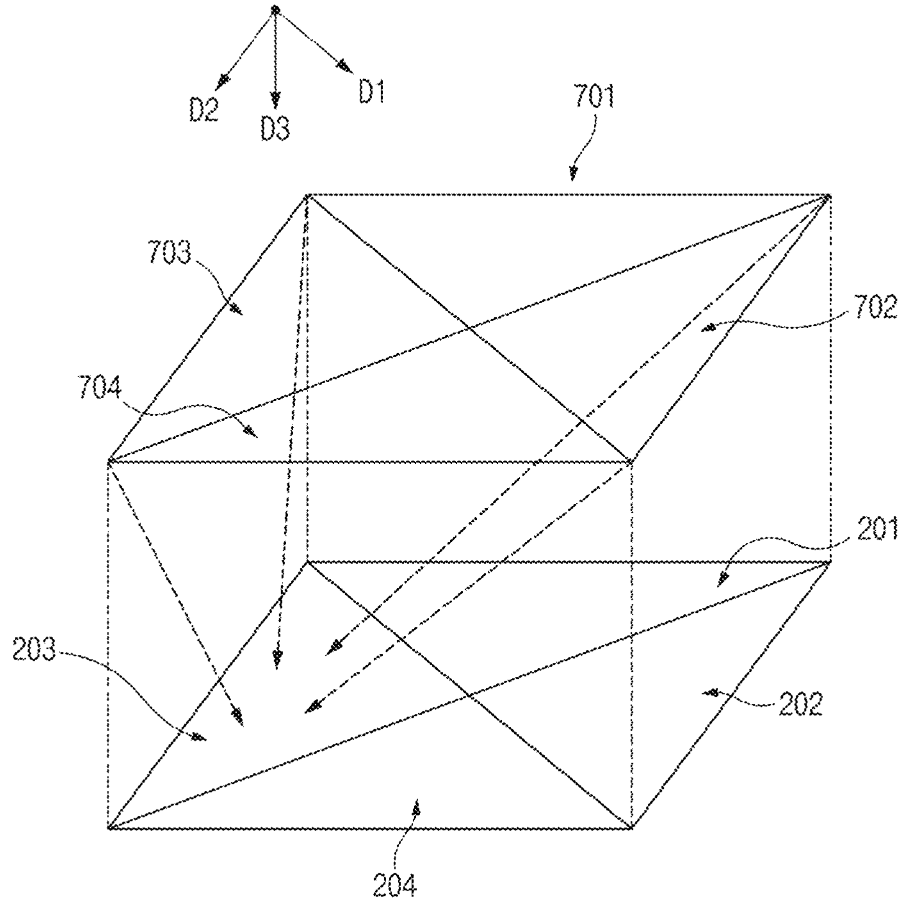

FIGS. 8A to 8C are diagrams illustrating examples of a phenomenon in which light separated by the meta lens 505 of FIG. 4 is guided based on some implementations of the disclosed technology.

Referring to FIGS. 8A to 8C, the first to fourth pixels 201-204 may represent a portion where the first to fourth pixels 201-204 of FIG. 3 overlap the fifth meta lens 505. In order to avoid overcomplicating the drawings, the first to fourth spectroscopic regions 701-704 are illustrated, and a three-dimensional (3D) structure of the fifth meta lens 505 in FIG. 7A is omitted from FIGS. 8A to 8C.

Referring to FIGS. 4, 6, 7A, and 8A, when green light included in the incident light is separated by the fifth meta lens 505, the green light may be guided to the first pixel 201. The green light may be guided to the fourth pixel 204, or may be guided to each of the first pixel 201 and the fourth pixel 204. In one embodiment in which the green light is guided to each of the first pixel 201 and the fourth pixel 204, the nanomaterial layer 720 of the fifth meta lens 505 may have a symmetrical structure with respect to a virtual line crossing the second spectroscopic region 702 and the third spectroscopic region 703. For example, the nano-patterns of the first spectroscopic region 701 and the fourth spectroscopic region 704 may satisfy the axisymmetric relationship. FIG. 8A illustrates an example in which green light is guided to the first pixel 201. A portion of the first pixel 201 shown in FIG. 8A to which the green light is guided may be an arbitrary region within the first optical filter 521 shown in FIG. 6.

Referring to FIGS. 4, 5, 7A, and 8B, when red light included in the incident light is separated by the fifth meta lens 505, the red light may be guided to the second pixel 202. A portion of the second pixel 202 shown in FIG. 8B in which the red light is guided may be an arbitrary region within the second optical filter 522 shown in FIG. 5.

Referring to FIGS. 4, 5, 7A, and 80, when the blue light included in the incident light is separated by the fifth meta lens 505, the blue light may be guided to the third pixel 203. A portion of the third pixel 203 shown in FIG. 8C in which the blue light is guided may be an arbitrary region within the third optical filter 523 shown in FIG. 5.

FIGS. 9A to 9D are plan views illustrating examples of the nanomaterial layer 720 shown in FIG. 7A. In FIGS. 9A to 9D, each of the shaded portions may indicate a pattern in which nanomaterials (e.g., SiN, $TiO_2$, GaN) are arranged.

Referring to FIGS. 4, 9A, 9B, 9C and 9D, the first spectroscopic region 701 may be a region in which the first pixel 201 and the fifth meta lens 505 overlap each other, and the second spectroscopic region 702 may be a region in which the second pixel 202 and the fifth meta lens 505 overlap each other, the third spectroscopic region 703 may be a region in which the third pixel 203 and the fifth meta lens 505 overlap each other, and the fourth spectroscopic region 704 may be a region where the fourth pixel 204 and the fifth meta lens 505 overlap each other.

In addition, FIGS. 9A to 9D illustrate examples of the nanomaterial layer 720 viewed from the third direction D3. In FIGS. 9A to 9D, the shaded portions may represent a plan view of nanoparticles with respective heights in the third direction D3.

Figure 9A:
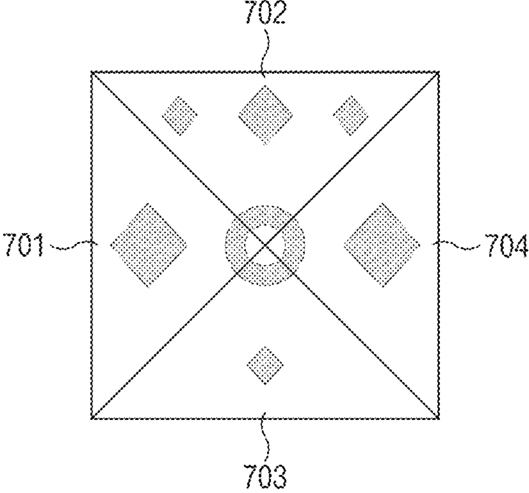
FIGS. 9A to 9D are plan views illustrating examples of a nanomaterial layer shown in FIG. 7A based on some implementations of the disclosed technology.

In FIG. 9A, the shaded pattern (hereinafter referred to as "first nano-pattern") may include cylindrical nanoparticles that are distributed across the first to fourth spectroscopic regions 701-704 at the center of the fifth meta lens 505. Here, each of the cylindrical nanoparticles may have an empty space, and each cylindrical nanoparticle may have a predetermined height. The first nano-pattern may include a plurality of pillar-shaped nanoparticles having a square bottom surface.

Figure 9B:
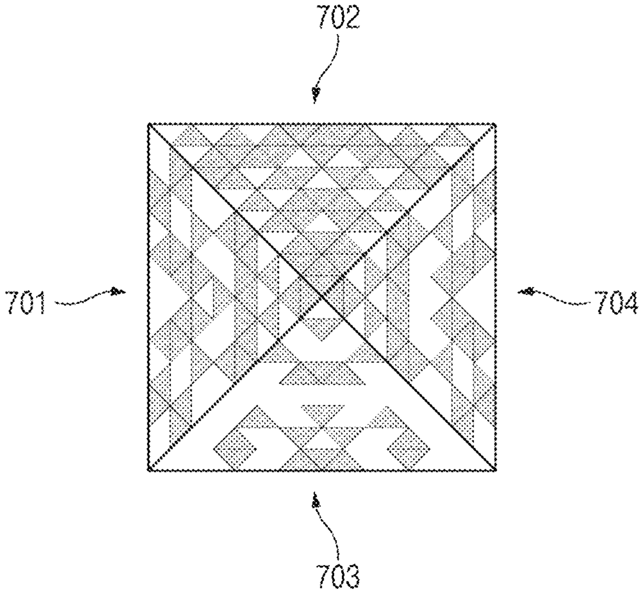

In FIG. 9B, in a situation in which each of the first to fourth spectroscopic regions 701-704 is divided into a plurality of unit grids each having a triangular shape, the shaded pattern (hereinafter referred to as "second nano-pattern") may include a pattern in which some parts of the plurality of unit grids are filled with nanoparticles each having a preset height in the third direction D3.

Figure 9C:
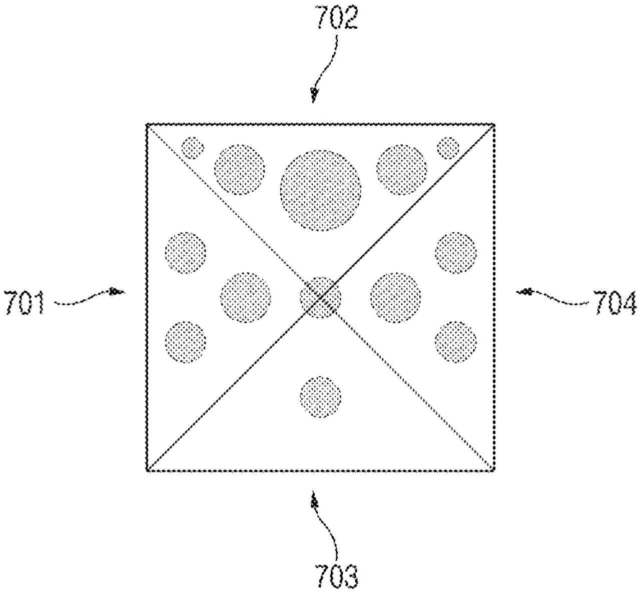

In FIG. 9C, the shaded pattern (hereinafter referred to as "third nano-pattern") may include a plurality of cylindrical nanoparticles each having a preset height in the third direction D3 at intersection points of the first to fourth spectroscopic regions 701-704.

Figure 9D:
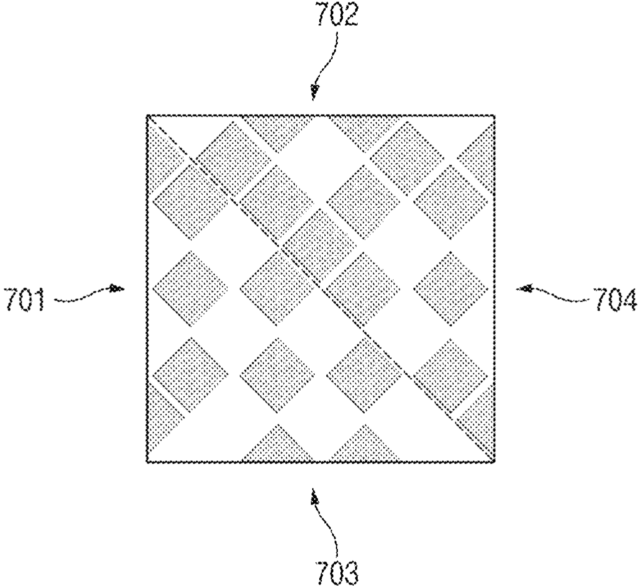

In FIG. 9D, in a situation in which each of the first to fourth spectroscopic regions 701-704 is divided into a plurality of unit grids each having a square shape, the shaded pattern (hereinafter referred to as "fourth nano-pattern") may include a pattern in which some parts of the plurality of unit grids are filled with nanoparticles each having a preset height in the third direction D3.

In the first to fourth nano-patterns, a region in which nanoparticles are disposed may be configured such that the second spectroscopic region 702 is larger in width than the first or fourth spectroscopic region 701 or 704. In addition, a region in which nanoparticles are disposed may be configured such that the third spectroscopic region 703 is smaller in width the first or fourth spectroscopic region 701 or 704.

FIGS. 9A to 9D illustrate that the nanoparticles are distributed in the second spectroscopic region 702 overlapping the second optical filter 522 that allows red light to pass therethrough, in a manner that the largest amount of nanoparticles is disposed in the second spectroscopic region 702 and the sum of cross-sectional areas of the nanoparticles is the largest, but the scope or spirit of the disclosed technology is not limited thereto. For example, all kinds of meta lenses, each of which allows light incident upon the fifth meta lens 505 to be separated for each wavelength or for each color in a manner that the separated light is guided to an optical filter that corresponds to either the color of light or a wavelength range of light penetrating each optical filter, can be applied to the embodiments of the disclosed technology.

In addition, the nano-patterns of the nanomaterial layer 720 are not limited to the first to fourth nano-patterns, and the shapes and cross-sections of nanoparticles to be used in the nano-patterns are not limited to squares, triangles, and circles, but include various shapes such as an oval shape or a cross shape. In the case of a cylindrical shape, a diameter may be modified, and in the case of a prismatic pillar shape, the shape and size of a bottom surface of the prismatic pillar shape may be modified, and such modified examples can be included in the embodiments of the disclosed technology. A method of designing the nano-patterns will be described with reference to FIGS. 10 and 11.

Figure 10:
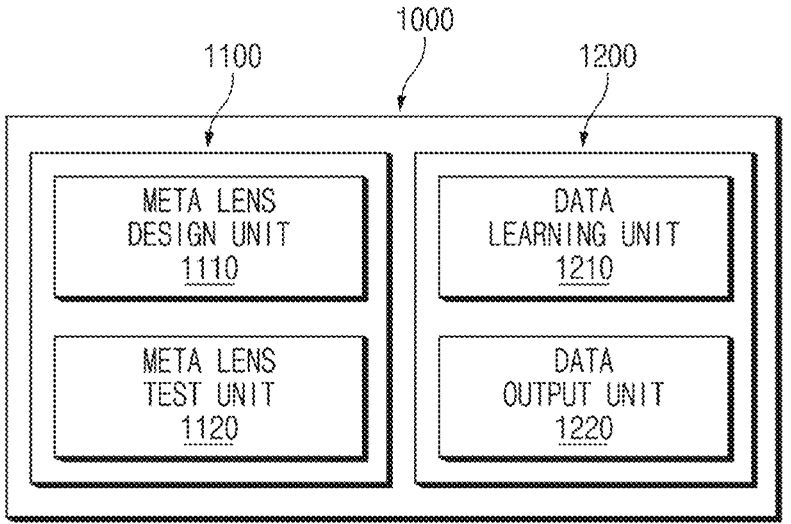
FIG. 10 is a block diagram illustrating a device for designing a meta lens based on some implementations of the disclosed technology.

FIG. 10 is a block diagram illustrating a device 1000 for designing the meta lens based on some implementations of the disclosed technology.

Referring to FIGS. 4 and 10, the meta lens design device 1000 may include an optical simulation unit 1100 and a deep learning technology unit 1200. The optical simulation unit 1100 may include a meta lens design unit 1110 and a meta lens test unit 1120. The deep learning technology unit 1200 may include a data learning unit 1210 and a data output unit 1210.

Referring to FIGS. 7A and 10, the meta lens design unit 1110 may arbitrarily design the nano-pattern of the nanomaterial layer 720.

When light is incident upon the nano-pattern designed by the meta lens design unit 1110, the incident light is separated into red light (having a wavelength of 600 nm-700 nm), green light (having a wavelength of 500 nm-600 nm), and blue light (having a wavelength of 400 nm-500 nm), so that the meta lens test unit 1120 may test which path can be used to guide each separated light. For example, the above-described test may be performed using at least one of a finite difference time domain (FDTD) method, a finite element method, or a moment method.

When light is incident upon each of a plurality of randomly designed nano-patterns, the data learning unit 1210 may assign a weight to each nano-pattern upon receiving data regarding refraction directions in which the red light, the green light, and the blue light and are refracted and focused. Here, the data received by the data learning unit 1210 may be result data of the meta lens test unit 1110.

The data output unit 1220 may design a nano-pattern of the nanomaterial layer 720 that can implement desired optical characteristics, and may output data about the designed nano-pattern.

The data output unit 1220 may use any one of the freeform design method, the genetic algorithm method, the particle swarm optimization method, and the adjacent method as a method for designing the nano-pattern that implements the desired optical properties.

Figure 11:
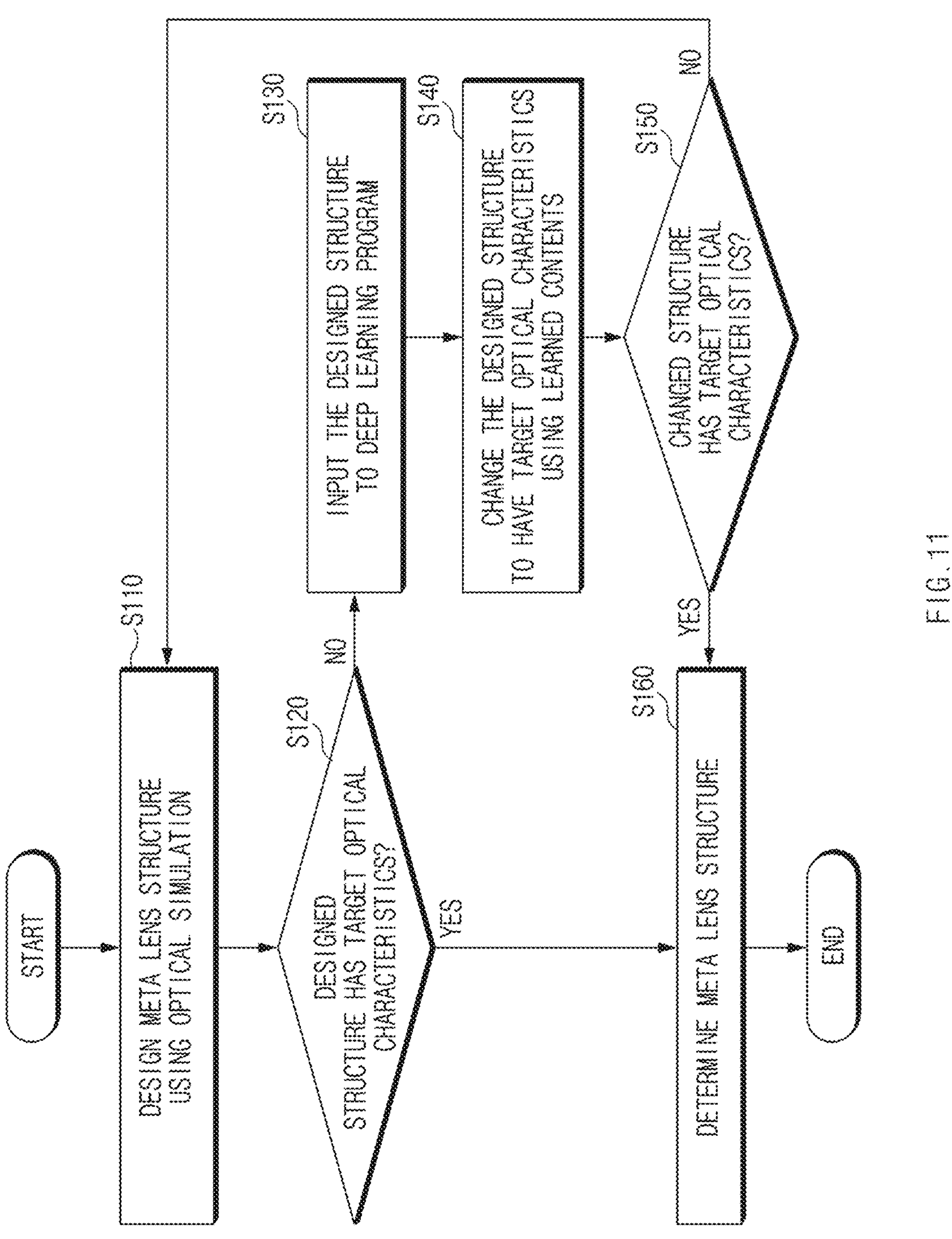
FIG. 11 is a flowchart illustrating an example of a method for designing a structure of meta lenses by the meta lens design device shown in FIG. 10 based on some implementations of the disclosed technology.

FIG. 11 is a flowchart illustrating an example of a method for designing a structure of the meta lenses by the meta lens design device 1000 shown in FIG. 10 based on some implementations of the disclosed technology.

The meta lenses described in FIG. 11 may refer to the first to ninth meta lenses 501-509 described in FIG. 4.

Referring to FIGS. 10 and 11, the nano-pattern of the meta lens may be arbitrarily designed in the meta lens design unit 1110 (S110). For example, the nano thin film layer of the meta lens can be partitioned into grids with a certain shape, and the nano-patterns may be arbitrarily designed by determining whether or not to place nanoparticles on each of the grids.

The meta lens test unit 1120 may determine whether the meta lens including the designed pattern has target optical characteristics (S120).

The above determination method may be performed using any one of the finite difference time domain method, the finite element method, and the moment method. The above target optical characteristics may be used to guide the separated light obtained when incident light is separated into light beams for each color, to the optical filter of the corresponding color.

If the meta lens including the designed pattern has the target optical characteristics (YES in S120), the nano-pattern of the meta lens and the structure of the meta lens can be determined (S160).

If the meta lens including the designed nano-pattern does not have the target optical characteristics (NO in S120), the designed nano-pattern can be input to the deep learning technology unit 1200 (S130), and the deep learning technology unit 1200 may include, for example, deep learning technology.

The deep learning technology unit 1200 may change the designed nano-pattern in the data output unit 1220 using the previously learned information acquired from the data leaning unit 1210 in a manner that the designed nano-pattern has target optical characteristics (S140). The method for changing the nano-pattern may be implemented using any one of the freeform design method, the genetic algorithm method, the particle swarm optimization method, and the adjacent method. The target optical characteristics may be used to guide the separated light obtained when incident light is separated into light beams for each color, to the optical filter of the corresponding color.

The meta lens test unit 1120 may determine whether the meta lens having the changed nano-pattern has the target optical characteristics (S150).

When the meta lens test unit 1120 determines that the meta lens having the changed nano-pattern has the target optical characteristics (YES in S150), the structure of the meta lens can be determined (S160).

If the meta lens test unit 1120 determines that the meta lens with the changed nano-pattern does not have the target optical characteristics (NO in S150), the meta lens design unit 1110 may arbitrarily redesign the nano-pattern of the meta lens.

As is apparent from the above description, the embodiments of the disclosed technology can provide the image sensing device with increased quantum efficiency and a method for designing a meta lens capable of increasing quantum efficiency.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image sensing device comprising:

a plurality of microlenses including first to fourth microlenses arranged in a (2×2) matrix structure;

a plurality of optical filters disposed under the first to fourth microlenses, and configured to correspond to the first to fourth microlenses, one microlens per optical filter, respectively; and an optical element disposed at a center of the (2×2) matrix structure among the first to fourth microlenses and configured to separate incident light into light rays of in different wavelength ranges of different colors to guide each of the light rays to one of the plurality of optical filters of a corresponding color.

2. The image sensing device according to claim 1, wherein the plurality of optical filters includes first to fourth optical filters, wherein the first optical filter is configured to transmit light of a first color, the second optical filter is configured to transmit light of a second color, the third optical filter is configured to transmit light of a third color, and the fourth optical filter is configured to transmit light of the first color.

3. The image sensing device according to claim 2, wherein:

the first color is green, the second color is red, and the third color is blue.

4. The image sensing device according to claim 1, wherein the optical element includes:

a thin film layer includes a first surface upon which the incident light is incident and a second surface facing or opposite to the first surface, wherein the second surface is in contact with a plurality of nanoparticles arranged in a predetermined pattern.

5. The image sensing device according to claim 4, wherein:

the predetermined pattern is repeatedly disposed on the second surface at a certain interval.

6. The image sensing device according to claim 4, wherein:

the plurality of nanoparticles includes at least one of gallium nitride, silicon nitride, or titanium dioxide.

7. The image sensing device according to claim 4, wherein:

each of the plurality of nanoparticles is formed in a cylindrical shape.

8. The image sensing device according to claim 7, wherein:

the plurality of nanoparticles includes a first nano-cylinder and a second nano-cylinder that have different diameters.

9. The image sensing device according to claim 4, wherein:

the plurality of nanoparticles is formed in a shape corresponding to one of a triangular pillar, a square pillar, a hexagonal pillar, or an octagonal pillar.

10. The image sensing device according to claim 4, wherein:

the thin film layer includes silicon dioxide or polymethyl methacrylate (PMMA).

11. The image sensing device according to claim 4, wherein:

the plurality of optical filters includes a first optical filter configured to transmit red light and a second optical filter configured to transmit blue light; and the predetermined pattern includes a first region in which the optical element overlaps the first optical filter and a second region in which the optical element overlaps the second optical filter, wherein the first region includes more nanomaterials than second region.

12. The image sensing device according to claim 4, wherein:

the plurality of nanoparticles is arranged to have a height of 700 nm or less in a direction perpendicular to the second surface.

13. The image sensing device according to claim 1, wherein:

the optical element is in contact with each of the first to fourth microlenses.

14. A method for manufacturing an image sensing device comprising:

arranging first to fourth microlenses in a (2×2) matrix structure;

arranging an optical element at a center of the (2×2) matrix structure; and forming first to fourth optical filters respectively corresponding to the first to fourth microlenses, wherein the optical element is configured to separate incident light into light rays corresponding to different colors and guides each of the light rays to one of the first to fourth optical filters of a corresponding color.

15. The method according to claim 14, further comprising:

determining a structure of the optical element using a program configured to perform an optical simulation.

16. The method according to claim 15, wherein:

the optical simulation is performed using one of a finite difference time domain method, a finite element method, or a moment method.

17. The method according to claim 15, further comprising:

determining whether the structure of the optical element separates the incident light into the light rays corresponding to different colors and guides each of the light rays to one of the first to fourth optical filters of a corresponding color.

18. The method according to claim 14, further comprising:

determining a structure of the optical element using a program including a deep learning technology.

19. The method according to claim 18, wherein:

the deep learning technology is implemented using one of a freeform design method, a genetic algorithm method, a particle swarm optimization method, or an adjacent method.

20. The method according to claim 18, further comprising:

determining whether the structure of the optical element separates the incident light into the light rays corresponding to different colors and guides each of the light rays to one of the first to fourth optical filters of a corresponding color.

21. The method according to claim 14, wherein:

the first optical filter is configured to transmit light of a first color;

the second optical filter is configured to transmit light of a second color;

the third optical filter is configured to transmit light of a third color; and the fourth optical filter is configured to transmit light of the first color.

22. The method according to claim 21, wherein the optical element is configured to:

guide the first-color light included in the incident light to the first optical filter or the fourth optical filter;

guide the second-color light included in the incident light to the second optical filter; and guide the third-color light included in the incident light to the third optical filter.

* * * * *